Figure 1:
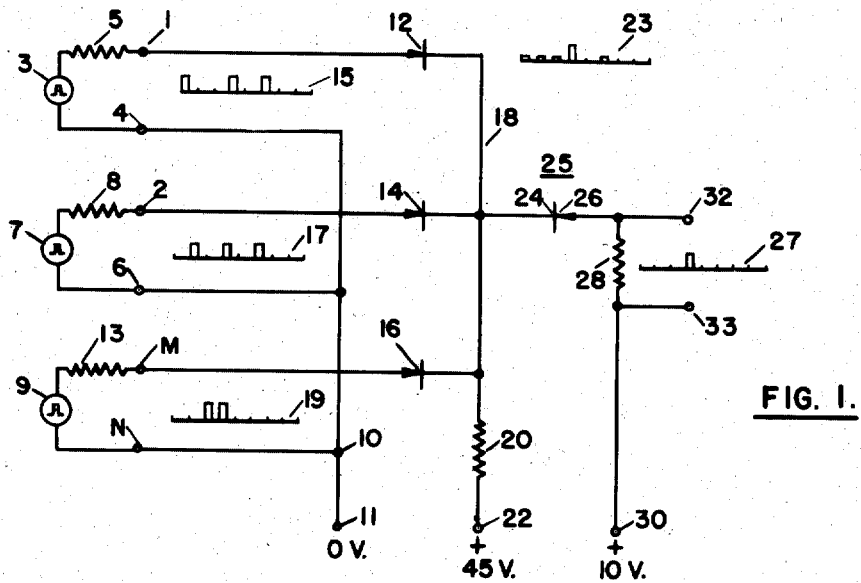

June 19, 1951  J. P. ECKERT, JR  2,557,729
IMPULSE RESPONSIVE NETWORK
Filed July 30, 1948  3 Sheets-Sheet 1

INVENTOR.
JOHN PRESPER ECKERT JR.

*George V. Eltgroth*
ATTORNEY

June 19, 1951  J. P. ECKERT, JR  2,557,729
IMPULSE RESPONSIVE NETWORK
Filed July 30, 1948  3 Sheets-Sheet 3

*INVENTOR.*
JOHN PRESPER ECKERT JR.
*ATTORNEY*

Patented June 19, 1951

2,557,729

UNITED STATES PATENT OFFICE 2,557,729

IMPULSE RESPONSIVE NETWORK

John Presper Eckert, Jr., Philadelphia, Pa., assignor to Eckert-Mauchly Computer Corporation, Philadelphia, Pa., a corporation of Pennsylvania Application July 30, 1948, Serial No. 41,441

4 Claims. (Cl. 250—27)

This invention relates to circuits for monitoring a plurality of electric signal lines and more particularly circuits uniquely responding to simultaneous energization of a predetermined number of signal lines.

In electrical equipment employing pulse techniques and in electrical equipment where operation and control are obtained by the switching of potentials, it is desirable to employ circuits responsive only to the coincidence of pulses or potentials on a preselected number of signal lines to energize a common output line. This invention concerns itself with an improved coincidence detecting circuit for use in electrical and electronic control equipment as illustrated in its application to electronic computing machines.

It is one of the objects of this invention to provide a new and improved means of detecting pulse coincidence on several input lines, coincidence producing energization of an output line.

Another object of this invention is to provide a new and improved circuit which is responsive to pulses occurring at a high frequency so that rapid detection of coincidence can be effected.

It is also an object of this invention to provide a circuit which is extremely simple, having a minimum number and complexity of parts.

A further object of the invention is to provide a new and novel pulse coincidence indicating network consuming no standby power.

Still another object of the invention is to provide a new and novel pulse coincidence indicating network delivering signal pulses characterized by the same polarity as the input impulses.

In the past when it has been desired to detect the coincident actuation of a number of input lines, electric relays have been employed. The contacts controlled by these relays were connected in a serial fashion with an output, so that the signal line deactivation of any relay would interrupt the exciting circuit. When all relays were simultaneously actuated, however, all contacts would be closed, and the serial circuit completed to energize the output line. Electric relays, however, have certain basic disadvantages in many applications. Since these devices are largely mechanical in nature, they are slow to operate. The maximum speeds with which the electromechanical relays can be caused to operate is approximately one-thousandth of a second. In many instances this speed is deemed too slow. The mechanical moving parts of the relays are subject to wear and breakage, and are therefore not completely reliable. The mechanical complexity of the electromechanical devices and their large size render them unsuitable for many applications.

Thermionic discharge devices of the multiple grid variety have also been applied to the detection of impulse coincidence. These suffer, however, from the disadvantage of a low mutual conductance when a large number of control electrodes are interposed between the cathode and anode and the requirement of pulses of positive polarity for their actuation. This latter fact, coupled with the polarity inverting properties of thermionic valve gates, hampers the designer materially in his freedom of action, requiring the frequent use of polarity inverting stages at points where they serve no other purpose than to insure the proper polarization of the impulses delivered to the thermionic valve gates. In addition, such valves are characterized by relatively high input and output capacitances, objectionally limiting the choice of circuit impedances which may be employed while retaining reasonably wide band response.

Other objects and inventions will become apparent from the following disclosure taken in conjunction with the accompanying drawings in which:

Fig. 1 schematically illustrates a network receiving positive pulses applied to a number of input lines and producing a positive output pulse.

Figure 2:
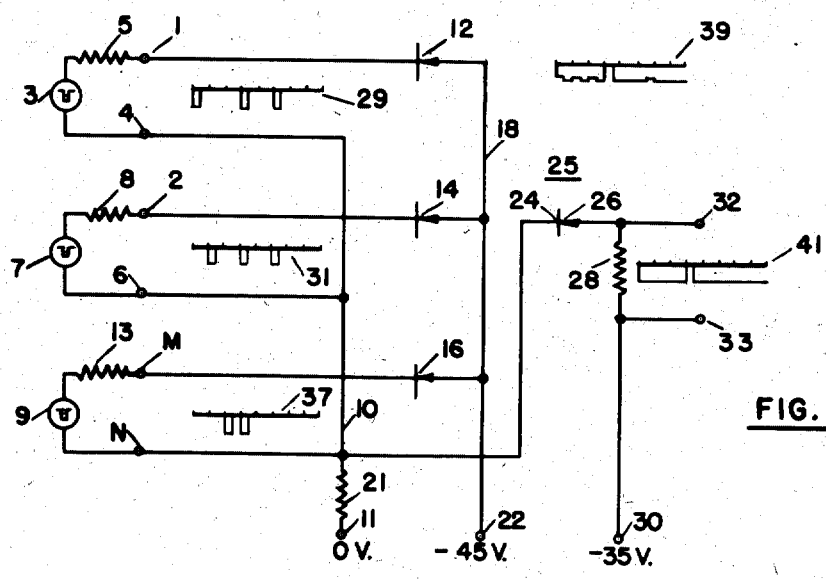

Fig. 2 schematically illustrates a network in which coincident application of negative pulses to a number of input lines produces a positive going output pulse.

Figure 3:
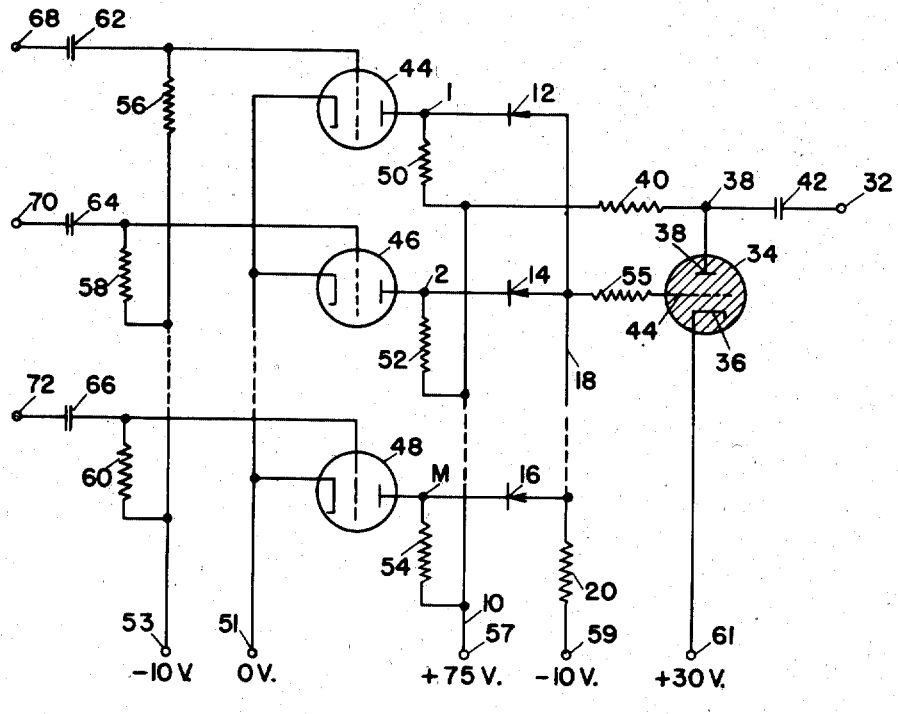

Fig. 3 schematically illustrates a network of thermionic valves and unilateral conductors in which coincident application of positive pulses to a number of input lines produces a positive output pulse.

Figure 4:
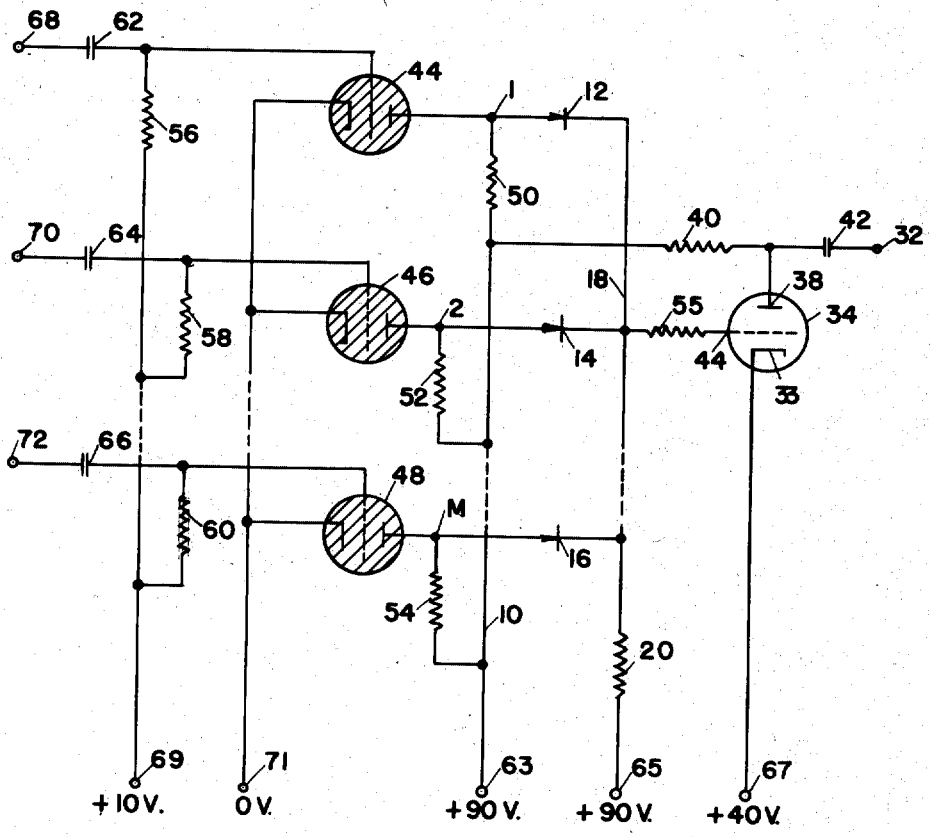

Fig. 4 schematically illustrates a network of thermionic valves and unilateral impedances delivering negative output impulses in response to the coincident negative energization of a plurality of input lines.

In the drawings, corresponding parts are identified by corresponding reference characters.

Referring now to Fig. 1, there are shown a plurality of unilaterally conducting crystal diodes 12, 14, 16 connected respectively between the input terminals 1, 2, and M and the common diode output lead 18. The functions of diodes 12, 14, and 16 may be performed by any body or combination of materials having suitable properties of unilateral conduction, i. e., Galena crystals, copper oxide rectifiers, or the Germanium crystal diode commercially identified as type 1N34. Commercially available rectifiers of the latter type are characterized by a very low shunt capacity and provide suitable operation in circuits of the type illustrated up to frequencies of a megacycle per second or more as compared with much lower frequencies for the copper oxide type. The common diode lead 18 may be connected, through a limiting resistance 20, with the supply terminal 22 maintained at a suitable positive potential, for example 45 volts, from any convenient source. The input terminal 1 is paired with corresponding terminal 4 and an impulse source 3 is connected between the terminal pair. The internal impedance of the source 3 is represented schematically by the resistance 5 and it is preferred that the limiting resistance 20 be much greater than the source impedance 5, or the forward resistance of unilateral conductors 12, 14, 16.

The input terminal 2 is similarly paired with a terminal 6 and signals are applied to this circuit from a source 7 connected between the terminals in series with its source impedance 8. Any number of additional signal circuits may be provided, as represented by the signal circuit terminals M and N, each of which also receives impulses from a source generally indicated at 9 with a source impedance 13.

One side of each signal circuit is connected together and to the common lead 10, returned to the supply terminal 11, connected with a point on any suitable electric supply source maintaining this terminal at 45 volts negative with respect to supply terminal 22.

A fourth unilateral conductor 25 is connected between the common diode output lead 18 and the signal output terminal 32, its anode 24 being connected with the lead 18, while the cathode 26 is connected with the output terminal 32. A resistor 28 is connected between output terminal 32 and terminal 33, which forms the return for the output signal circuit. The signal return terminal 33 is linked with supply terminal 30 which may be maintained at a positive potential of 10 volts with respect to supply terminal 11. It is desired that the potential of supply point 30 be intermediate that of supply points 11 and 22.

The operation of the network is best understood with reference to the various combinations of potentials which may be applied. The graphic illustrations 15, 17 and 19 associated with input terminal pairs 1, 4; 2, 6; and M, N represent possible combinations of input signals. The impulse groups appearing on the common diode output line 18 are shown at 23, while those delivered to the output terminals 32, 33 are shown at 27. For purposes of illustration, an operating cycle accommodating eight pulse positions has been selected. It will be noted that the unilateral conductors 12, 14, 16 are normally traversed by a current flowing from the supply terminal 22 through limiting resistor 20, thence in parallel through the unilateral conductors 12, 14, 16 and their associated source impedances to the return terminal 11. It will be noted from the graphic portrayal at 15 that the signal pulses applied to the unilateral conductor 12 have a polarity opposing the normally present flow of current. The same is true of the pulse polarity applied to the balance of the unilateral conductors 14 and 16. The signal delivered from the source 3 includes a positive pulse in pulse position 1, interrupting the flow of current through unilateral conductor 12 when its amplitude exceeds the potential of supply point 22. However, the sources 7 and 9 deliver no impulses to their associated unilateral conductors 14 and 16, respectively, during this interval and hence the flow of current through these branch circuits continues through unilateral conductors 14 and 16. The continued flow of current maintains the diode end of the current limiting resistance 20 at or near the potential of the supply terminal 11. The change in potential at this point corresponds to the negative increment in current through the resistor 20 and is represented by the low amplitude impulse in pulse position 1 in the showing of 23.

The passage of a pulse interval brings a pulse in pulse position 2 to the input of unilateral conductor 14. Since no corresponding impulse is delivered in this pulse position from sources 3 and 9, the flow of current through resistor 20 and unilateral conductors 12, 16 continues, reduced only in magnitude by the amount of current formerly flowing through unilateral conductor 14, thus giving rise to a low amplitude output impulse, illustrated in pulse position 2 at 23. The arrival of pulses at pulse position 3 from the source 9 gives rise to a similar reduced amplitude impulse because of the absence of corresponding impulse energy from sources 3 and 7.

Each of the impulse sources 3, 7, 9 delivers an electric impulse in pulse position 4 simultaneously, driving the cathodes of unilateral conductors 12, 14, 16 positive to effect a simultaneous reduction in the flow of current through all three branch circuits. When the input impulses are of sufficient amplitude, the flow of current through the resistor 20 is completely interrupted resulting in an impulse in pulse position 4 whose amplitude corresponds approximately to the potential at which the supply terminal 22 is normally maintained.

No source delivers an impulse in pulse position 5 and hence no output impulse is delivered to the common diode output line 18 during this interval.

Sources 3 and 7 simultaneously deliver impulses to their associated unilateral conductors for pulse position 6, while source 9 supplies no energy during this interval. This interrupts the flow of current through the branch circuits including unilateral conductors 12 and 14, while permitting the flow of current through unilateral conductor 16. A resultant impulse of reduced amplitude appears in pulse position 6 on the common diode output line 18 and has an amplitude corresponding approximately to the product of the current flowing through the resistor 20 and the source impedance 13.

It will be noted that a signal impulse appears on the common diode output line 18 in response to the existence of an input signal impulse from any one of the sources connected with the unilateral conductors 12, 14, 16. However, the impulses appearing on this line are of relatively small amplitude unless energy is simultaneously present in the outputs of all three sources. Thus, the signal impulse corresponding to the simultaneous presence of signals may be distinguished from other impulses by its far greater amplitude and may be conveniently separated therefrom by a suitable amplitude discriminator. Such a device may take the form of the unilateral conductor 25 shown in Fig. 1, whose cathode 26 is normally biased positively with respect to its anode by the potential difference between the supply terminals 11 and 30. For this purpose the supply terminal or lead 30 is maintained at a potential intermediate that of the supply leads 11 and 22. The voltages chosen for the purpose of illustration give rise to a maximum coincident impulse amplitude on the common diode output lead 18 of plus 45 volts, while the impulses resulting from non-coincident impulse signals are maintained at less than 10 volts peak. Accordingly, only a pulse corresponding to the coincident energization of the input circuits connected with unilateral conductors 12, 14, 16 is delivered to the output lead 32, the remainder of the impulses being suppressed by the 10 volt threshhold or bias applied to the unilateral conductor 25.

The shunt capacitances of the Germanium crystal diodes earlier referred to are in the range of 0.5 to 1.0 mmf.; that is, about one-tenth the corresponding input and output capacities of commercially available vacuum tubes. Inspection of Fig. 1 discloses that the junction of four diodes is connected to the low potential terminal of the limiting resistor 20, corresponding to a total capacity loading of 2.0 to 4.0 mmf. at this point, a sufficiently low capacity to permit very wide band of response without the use of special compensating circuits associated with the resistor 20. This represents a considerable advantage over similar circuits employing vacuum tubes for the same purpose, in addition to the saving in standby power.

The previously described circuit is designed to accommodate impulses of positive polarity. Similar impulses of negative polarity may be accommodated in a circuit such as shown in Fig. 2, in which corresponding parts are identified by corresponding reference characters. The source 3, having a source impedance 5, is connected with input terminals 1 and 4, the former being connected with the anode of unilateral conductor 12. Similarly the impulse source 7, having a source impedance 8, is connected with input terminals 2 and 6, the former being connected with the anode of unilateral conductor 14. Any number of additional sources, represented generally by the source 9 with the source impedance 13, may be connected with additional sets of input terminals M, N, of which the former is similarly connected to the anode of unilateral conductor 16, in each set there being one additional unilateral conductor for each additional set of input circuits to be accommodated. The input terminals 4, 6 and N are connected together to the common lead 19 which is returned to the supply terminal 11 through a resistor 21. The supply terminal 11 may be maintained at a reference potential from any suitable electrical source. The cathodes of the unilateral conductors 12, 14, 16 are also connected together and to the common diode output lead 18, which is connected with a supply terminal 22 maintained at a negative potential of 45 volts with respect to supply terminal 11 by any suitable source of potential. The common lead 10 is connected with the anode 24 of the unilateral conductor 25 whose cathode 26 is connected with the output terminal 32. The other side of the signal output circuit is completed by the return terminal 33, connected with the output terminal 32 by a resistor 28, in addition to its connection with the supply terminal 30 maintained at a negative potential of 35 volts from any suitable source.

As earlier noted, and as indicated from the voltage-time characteristics of the input signals illustrated at 29, 31 and 37, the network of Fig. 2 accommodates negatively polarized impulses. In the absence of input signals the unilateral conductors 12, 14, 16 are normally traversed by current flowing through resistor 21, and all the branch paths including the sources 3, 7, 9 with their associated source impedances 5, 8, 13 and unilateral conductors 12, 14, 16, to the supply terminal 22. The negatively poled input pulses oppose the flow of this normally existing current as in the previous illustration. Source 3 delivers a pulse in pulse position 1, but this pulse has no counterpart in the outputs of sources 7 and 9; hence although the flow of current through unilateral conductor 12 is interrupted there is no effect on the currents flowing through the branch circuits including unilateral conductors 14 and 16, whence only a small change in the current flowing through resistor 21 is to be observed, as indicated by the relatively small magnitude of the impulse to be observed in pulse position 1 on the common diode line 10, which remains very nearly 45 volts negative with respect to supply terminal 11 due to the negligible drop through the unilateral conductors 12, 14, 16 and source impedances 5, 8, 13. During pulse position 2, input energy is supplied only from source 7 without counterpart in the output sources 3 and 9, giving rise to a similar impulse of small amplitude on the line 10. A similar reaction is noted during pulse position 3, when energy is supplied only from source 9 with no signal from the sources 3 and 7 during this interval.

During pulse position 4 negative impulses are simultaneously applied to the anodes of unilateral conductors 12, 14, 16 from the sources 3, 7, 9 to simultaneously interrupt the flow of current through all three branch circuits. The cessation of current flow reduces the voltage drop across the resistor 21 to zero, developing an effective impulse of relatively large magnitude on the common line 10 at this time.

So long as the line 10 is negative with respect to supply terminal 30 no current flows through the unilateral conductor 25 and the output resistor 28 and hence no signal is delivered to the output terminals 32, 33. Consequently the impulses on line 10 produced by non-coincident signals at the inputs of the three branch circuits do not develop corresponding output impulses at 32, 33, since the voltage excursions produced thereby are less than the 10 volt differential. In the presence of coincident impulses the common lead 10 rises to substantially zero potential, making the anode 24 positive with respect to its associated cathode, giving rise to a current flow delivering an impulse to the output terminals 32, 33. By the application of suitable bias potentials to the output circuit of Fig. 2, it is possible to derive positively poled output impulses from coincident negative impulses.

This arrangement, however, does not match the performance of the network of Fig. 1 because of the fact that the capacity to ground of the sources 3, 7, 9 is effectively in parallel with the resistor 21, diminishing the band width of response. Where its other characteristics outweigh the question of band width in importance, however, this arrangement may be advantageously employed.

It may frequently occur that the pulses whose coincidences are to be detected exist at a relatively low voltage level and that the work circuit responding to the output signal operates more satisfactorily at a higher signal level. In this event, amplification may be added subsequent to the output terminal 32 in Figs. 1 and 2, or amplifiers may be introduced ahead of the coincidence detecting circuits in conventional fashion. The latter arrangement, shown in Fig. 3, improves the action of the coincidence detecting circuits. In this arrangement the anodes of triodes 44, 46, 48, respectively, are connected with the anodes of unilateral conductors 12, 14, 16. In addition the anode of valve 44 is connected with supply terminal 57 through a resistor 50, the anode of valve 46 is connected with supply terminal 57 through resistor 52, and the anode of valve 48 is connected with the supply terminal 57 through resistor 54. The dashed lines in the anode line indicate that any number of thermionic valves may be inserted intermediate this position, depending upon the number of circuits to be monitored.

The cathodes of the valves 44, 46 and 48 are returned to the supply terminal 51 which may be maintained at zero reference potential, while the grids of these valves are returned through resistors 56, 58, 60, respectively, to the bias supply terminal 53 normally maintained sufficiently negative with respect to supply terminal 51 to prevent current flow through the valves in response to the anode potential applied between the terminals 51 and 57.

A further advantage of this arrangement is that it is non-critical with respect to source impedances and accordingly, impulse sources of any impedance may be connected with input terminals 68, 70, 72 which are coupled through capacitors 62, 64, 66 with the control grids of the thermionic valves. The delivery of positive pulses from these sources to the control grids of the associated valves gives rise to anode current pulses reducing the anode potential momentarily to cooperate with the coincidence detecting rectifiers in a manner later to become apparent.

The cathodes of unilateral conductors 12, 14, 16 are connected together and to one terminal of the grid current limiting resistor 55 whose other end is linked to the control electrode 44 of the thermionic valve 34. In addition, the common diode line 18 is connected with the supply terminal 59 through the resistor 20. The cathode 36 of the thermionic valve 34 is returned to the supply terminal 61 which may be maintained at 30 volts positive, while its anode is linked through anode resistor 40 with the supply terminal 57. A coupling capacitor 42 links the anode 38 of thermionic valve 34 with the output terminal 32.

The resistors 50, 52, and 54 are relatively low, preferably less than resistor 20, while resistance 55 may be of the same order of magnitude or greater than the resistor 20. In the absence of input signals, it will be noted that the polarity of the voltage between terminals 57 and 59 has the sense of maximum conductivity of the unilateral conductors 12, 14, 16, and the common diode lead 18 is maintained at a relatively high positive potential, giving rise to the continued conduction of current through the valve 34. The circuit design is such that in this condition grid current is drawn by the valve 34 to produce a considerable drop in the resistor 55, whereby small changes in the potential of the common diode line 18 are without significant effect on the anode current traversing the load resistor 40.

If a positive impulse be delivered to the input terminal 68 and hence to the control electrode of the thermionic valve 44, an anode current impulse flows through the resistor 50 depressing the anode potential to a valve which may be lower than the positive potential of the common diode lead 18, whereby current flowing through this branch circuit is interrupted. This does not produce a substantial change in the voltage of the common diode lead 18, however, because of the continued current flow through alternative paths including unilateral conductors 14, 16 whose associated input terminals, it may be assumed, have not been simultaneously excited. The same will be true for the simultaneous excitation of any two of the input terminals, the continued flow of current through the third of the unilateral conductors serving to maintain the common diode lead 18 at a sufficiently high positive potential to prevent appreciable change in the anode current flowing through valve 34. If positive impulses be now simultaneously applied to all three input terminals, the anodes of all three thermionic valves shift negatively, substantially reducing the current flow through the resistor 20 and permitting the common diode lead 18 to swing negatively to a degree such that a substantial negative bias is impressed on the control electrode of the valve 34, interrupting the flow of current therethrough during the overlapping of the assumed positive input impulses. It will be observed that operation of thermionic valve 34 with the grid in the positive region drawing grid current through a relatively high grid current limiting resistor creates an amplitude discriminatory or threshold circuit similar in its effect to those previously delineated, non-responsive to the small potential excursions on the common diode lead 18 attending the interrupting of current flow through any fewer than all of the alternative branch circuits established by the unilateral conductors 12, 14, 16. This network receives positive impulses and delivers in response thereto positive impulses.

The tube and unilateral conductor network shown in Fig. 4 differs from previous arrangements in that they are designed to accommodate negatively poled input impulses and deliver in response to the coincident application thereof, negatively poled output impulses. In this arrangement the thermionic valve 44 is connected through anode load resistor 50 with the supply terminals 63 which may be maintained at a positive potential of 90 volts. The thermionic triode 46 is connected through anode load resistor 52 to the supply terminal 63 and the triode valve 48 is similarly connected with the supply terminal 63 through the load resistor 54. The cathodes of the respective valves may be connected with supply terminal 71, while the grids are returned respectively through resistors 56, 58, 60 to supply terminal 69 which may be maintained at a positive potential of 10 volts. This network is similarly insensitive to source impedances, and impulses from any desired sources or combination thereof may be applied to the input terminals 68, 70, 72 and thence to the control electrodes of the associated valves through coupling capacitors 62, 64, 66. Since the bias applied to the grid circuit of these valves is positive they are normally conductive and their anodes are at a relatively low potential, approaching that of the cathode. The cathodes of unilateral conductors 12, 14, 16 may be connected respectively with the anodes of the valves 44, 46, 48, while the anodes of the unilateral conductors are connected together and to the common diode lead 18 which is linked with the supply terminal 65 by a resistor 22. In the illustrative schematic, the terminal 65 is indicated as being maintained at the same potential as the terminal 63, though this is not critical and a wide range of positive potentials at this point may be accommodated.

As in the previous illustration, an output valve 34 is employed whose cathode 33 is connected with the supply terminal 67 which may be maintained at a positive potential of 40 volts, while its anode 38 may be linked with the supply terminal 63 through anode load resistor 40, which is in turn coupled with the output terminal 32 through output capacitor 42.

As earlier noted, the normally existent flow of current through the valve 44, 46, 48 reduces their anode potentials to a relatively low value, whence a flow of current is normally established through the branch circuits including the unilateral conductors 12, 14, 16. The interruption of current flow through any one of the coupling valves, or, in fact, any two of the valves is ineffective in changing to any substantial degree the potential of the common diode lead 18, which remains at the relatively low positive potential fixed by the anode potential of the conducting thermionic valve of the group.

Since the cathode 33 of the coupling valve 34 is returned to a positive potential, this impresses a cut-off bias on its control electrode, preventing the flow of current through the anode load resistor 40. If the grids of all the valves are now all driven negative simultaneously, all the anodes rise in value to the supply potential of 90 volts, cutting off the flow of current through the resistor 20. Since the common diode lead 18 assumes a positive potential of 90 volts, which is 50 volts positive with respect to the cathode 33 of the output valve 34, a positive voltage is applied to one end of resistor 55. The grid current produced thereby is limited by the resistor 55 and the resultant anode current impulse traversing the resistor 40 delivers a signal of negative polarity to the output terminal 32 through the coupling capacitor 42.

In the drawings and in the detailed description of the improved impulse responsive network it has not been felt necessary to discuss in detail the various power supplies or the heaters which may be utilized for bringing the thermionic cathodes to operating temperature, since these elements are well known to those skilled in the art.

There will be obvious to those skilled in the art many minor variations and modifications not departing materially from the principles of the invention, as they are capable of wide application.

What is claimed is:

1. In electric signal responsive apparatus, a first signal circuit characterized by a first source impedance, a second signal circuit characterized by a second source impedance, a first unilateral impedance having one end of predetermined polarity connected with one side of said first signal circuit, a second unilateral impedance having one end of predetermined polarity connected with one side of said second signal circuit, a source of electric potential connected between the other ends of said unilateral impedances and the other sides of said signal circuits through a limiting impedance, the polarity of said electric potential source during the existence of a desired signal corresponding to the sense of maximum admittance of said unilateral impedances, an output signal circuit, and a signal transfer link having a transfer threshhold connected between said limiting and said output signal circuit impedance, said transfer threshhold corresponding substantially to a signal of magnitude equal to the potential of said electric potential source multiplied by the ratio of the highest source impedance to said limiting impedance.

2. In an electric signal responsive apparatus, a first signal circuit, a second signal circuit, a first unilateral conductor having one end of predetermined polarity connected with one side of said first signal circuit, a second unilateral conductor having one end of said predetermined polarity connected with one side of said second signal circuit, a limiting resistance, a source of electric potential connected between the other ends of said unilateral impedances and the other sides of said signal circuits through said limiting resistance, the polarity of said electric potential corresponding to the sense of maximum conductivity of said unilateral conductors, an output signal circuit, a third unilateral conductor linking said output signal circuit with said limiting resistance, and a source of electric potential connected with said output signal circuit with a polarity tending to establish a current flow through said third unilateral conductor in its direction of minimum conductivity.

3. In electric signal responsive apparatus, a first signal circuit, a second signal circuit, a first unilateral conductor having one end of predetermined polarity connected with one side of said first signal circuit, a second unilateral conductor having one end of said predetermined polarity connected with the other side of said second signal circuit, a first supply line maintained at a first electric potential connected with the other side of said signal circuits, a second supply line maintained at a different second electric potential connected with the other side of said unilateral conductors, a limiting resistance connected in one of said supply lines, a third unilateral conductor connected at one end with said limiting resistance, and a return resistor connected between the other end of said third unilateral conductor and a third supply line maintained at a potential intermediate said first and second potentials, the sense of connection of said third unilateral conductor being such that in the absence of signals said third unilateral conductor receives a potential tending to force current through the said third unilateral conductor in its direction of minimum conductivity.

4. In electric signal responsive apparatus, a first signal circuit, a second signal circuit, a first unilateral conductor having one end of predetermined polarity connected with one side of said first signal circuit, a second unilateral conductor having one end of said predetermined polarity connected with one side of said second signal circuit, a first supply line maintained at a first electric potential connected with the other side of said signal circuits, a limiting resistance, a second supply line maintained at a different second electric potential connected with the other side of said unilateral conductors in series with said limiting resistance, a third unilateral conductor connected at one end with said limiting resistance, and a return resistor connected between the other end of said third unilateral conductor and a third supply maintained at a potential intermediate said first and second potentials, the sense of connection of said third unilateral conductor being such that in the absence of signals said third unilateral conductor receives a potential tending to force current through the said third unilateral conductor in its direction of minimum conductivity.

JOHN PRESPER ECKERT, Jr.

REFERENCES CITED

The following references are of record in the file of this patent:

UNITED STATES PATENTS

| Number | Name | Date |
|--------|------|------|
| 2,171,918 | Dillenburger | Sept. 5, 1939 |
| 2,432,188 | Bliss | Dec. 9, 1947 |
| 2,434,153 | Grosdoff | Jan. 6, 1948 |

OTHER REFERENCES

Nature—vol. 125—No. 3156—April 26, 1930 "Method of Registering Multiple Simultaneous Impulses . . . ." by Rossi—page 636.